US008757578B2

(12) United States Patent
Kitamura et al.

(10) Patent No.: US 8,757,578 B2
(45) Date of Patent: Jun. 24, 2014

(54) SLIDE DEVICE FOR VEHICLE SEAT

(75) Inventors: Atsuo Kitamura, Tokyo (JP); Yutaka Ofuji, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 542 days.

(21) Appl. No.: 13/064,086

(22) Filed: Mar. 4, 2011

(65) Prior Publication Data

US 2011/0233371 A1    Sep. 29, 2011

(30) Foreign Application Priority Data

Mar. 26, 2010  (JP) .................................. 2010-072395

(51) Int. Cl.
*B60N 2/06*    (2006.01)

(52) U.S. Cl.
USPC ...................... 248/430; 296/65.13; 296/65.15

(58) Field of Classification Search
CPC ..... B60N 2/0715; B60N 2/0843; B60N 2/062
USPC ............. 248/430, 429, 424; 296/65.13, 65.15
See application file for complete search history.

(56) References Cited

U.S. PATENT DOCUMENTS

| 4,760,988 | A | * | 8/1988 | Bianchi et al. | ................ 248/430 |
| 4,949,931 | A | * | 8/1990 | Fujiwara et al. | ............. 248/429 |
| 5,785,292 | A | * | 7/1998 | Muraishi et al. | ............ 248/429 |
| 5,800,015 | A | * | 9/1998 | Tsuchiya et al. | ............. 297/331 |
| 6,059,345 | A | * | 5/2000 | Yokota | ....................... 296/65.14 |
| 6,488,250 | B1 | * | 12/2002 | Munch | ......................... 248/430 |

FOREIGN PATENT DOCUMENTS

JP    2007-069694    3/2007

* cited by examiner

*Primary Examiner* — Anita M King
(74) *Attorney, Agent, or Firm* — McGinn IP Law Group, PLLC

(57) ABSTRACT

A slide device for vehicle seat in which rollers are arranged at three positions on a lower rail including front and rear portions thereof. Among the rollers, the rollers located at the front and rear portions of the upper rail are pivotally supported by roller shafts and that are prohibited from moving on the upper rail, while the rollers located at the position other than the front and rear portions of the upper rail are pivotally supported by a roller shaft that is allowed to move downward on the upper rail.

13 Claims, 5 Drawing Sheets

FIG. 3A
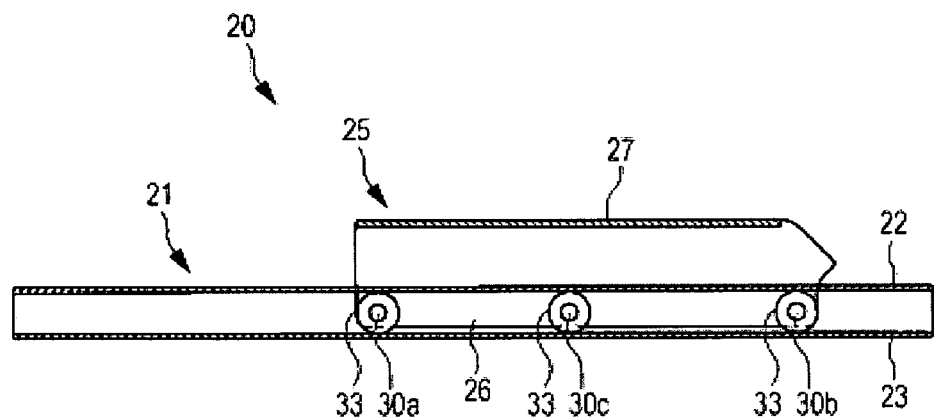
FIG. 3B
FIG. 3C
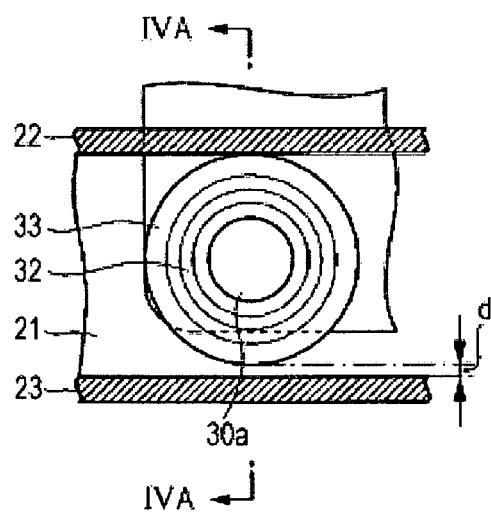
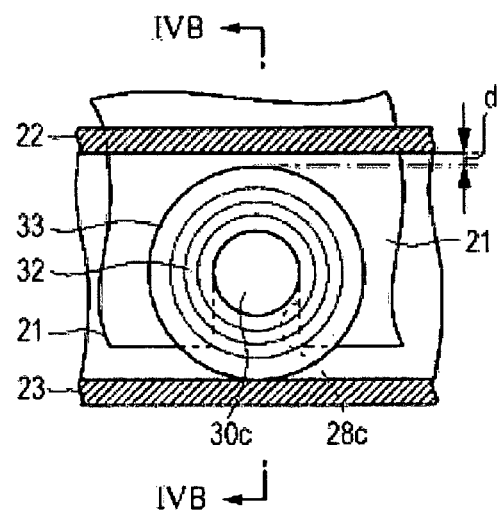

SLIDE DEVICE FOR VEHICLE SEAT

CROSS REFERENCES TO RELATED APPLICATIONS

The present application claims priority from Japanese Patent Application No. 2010-072395 filed on Mar. 26, 2010, the entire contents of which are hereby incorporated by reference.

BACKGROUND OF THE INVENTION

1. Field of the Invention

The present invention relates to a slide device for a vehicle seat that moves a seat body in the front-rear direction of a vehicle body by a relative movement of an upper rail to a lower rail.

2. Description of the Related Art

A typical slide device for a vehicle seat is mainly configured with a lower rail being fixedly installed on a floor of a vehicle body and extending in the front-rear direction of the vehicle body, and an upper rail being coupled to the lower rail so as to be relatively movable and supporting a seat body.

In this type of slide device, the coupling of the upper rail to the lower rail is generally achieved by rollers that are respectively attached to front and rear portions of the upper rail and supported so as to be rollable between a bottom wall and a top wall of the lower rail. In order to ensure a smooth seat slide operation through the rolling of the rollers, outer diameters of the rollers are generally set to be smaller than a gap between the bottom wall and the top wall of the lower rail. However, a space formed thereby between the lower rail and the rollers may cause the rollers to rattle.

As a technology that ensures the smooth seat slide operation while preventing an usual sound due to the rattling of the rollers, for example, Japanese Unexamined Patent Application Publication No. 2007-69694 discloses a technology that provides sub-rollers respectively near main rollers provided on the front and rear portions of the upper rail, and biases the sub-rollers upward and abuts the sub-rollers to the top wall of the lower rail so to abut the main rollers to the bottom wall of the lower rail.

Incidentally, a slide device which supports an occupant through a seat body requires a certain supporting strength and the like. Accordingly, in order to ensure supporting strength in the slide device of this type while more reliably preventing the rattling of the upper rail and the like, it is preferable to arrange rollers not only at the front and rear portions of the upper rail but also at an intermediate position therebetween and the like as needs dictate.

However, if rollers are arranged in tandem at three or more positions on the upper rail, a smooth movement of the upper rail in the front-rear direction may be hindered when, for example, the lower rail is bent by an impact upon a vehicle frontal crash or the like. In particular, in the case of a so-called three-row seating vehicle, which has three rows of seats in a vehicle compartment in the front-rear direction, if the front-rear movement of an seat body in the second row is hindered, it may be difficult for an occupant seated in the third row to escape quickly.

In order to address this problem while ensuring a smooth seat slide operation also upon a frontal crash, the lower rail may be composed of a highly rigid material for example, but the enhancement of the rigidity of the lower rail could cause an increase in weight, a steep rise in cost, or the like.

SUMMARY OF THE INVENTION

The present invention is made in view of the above, and it is an object of the present invention to provide a slide device for a vehicle seat that prevents the rattling of a seat body with a simple configuration while being capable of reliably moving a seat body in the front-rear direction upon a vehicle frontal crash.

A slide device for a vehicle seat according to the present invention includes: a lower rail extending in the front-rear direction of a vehicle body and having a bottom wall and a top wall; an upper rail extending in the front-rear direction of the vehicle body and slidably supported the lower rail; and a plurality of rollers provided between the bottom wall and the top wall of the lower rail so as to rollable and arranged in tandem at three or more positions of the upper rail, wherein the rollers at two positions among the rollers are pivotally supported by fixed shafts that are prohibited from moving on the upper rail while the other rollers are pivotally supported by a movable shaft that is allowed to move in the vertical direction on the upper rail.

According to the slide device for a vehicle seat of the present invention, rattling of the seat body is prevented by a simple configuration while the seat body can be reliably moved in the front-rear direction even upon a vehicle frontal crash.

BRIEF DESCRIPTION OF THE DRAWINGS

FIG. 3A is a sectional view of the slide device taken along the line IIIA-IIIA of FIG. 2. FIGS. 3B and 3C are enlarged sectional views of main parts

DESCRIPTION OF THE PREFERRED EMBODIMENT

Figure 1:
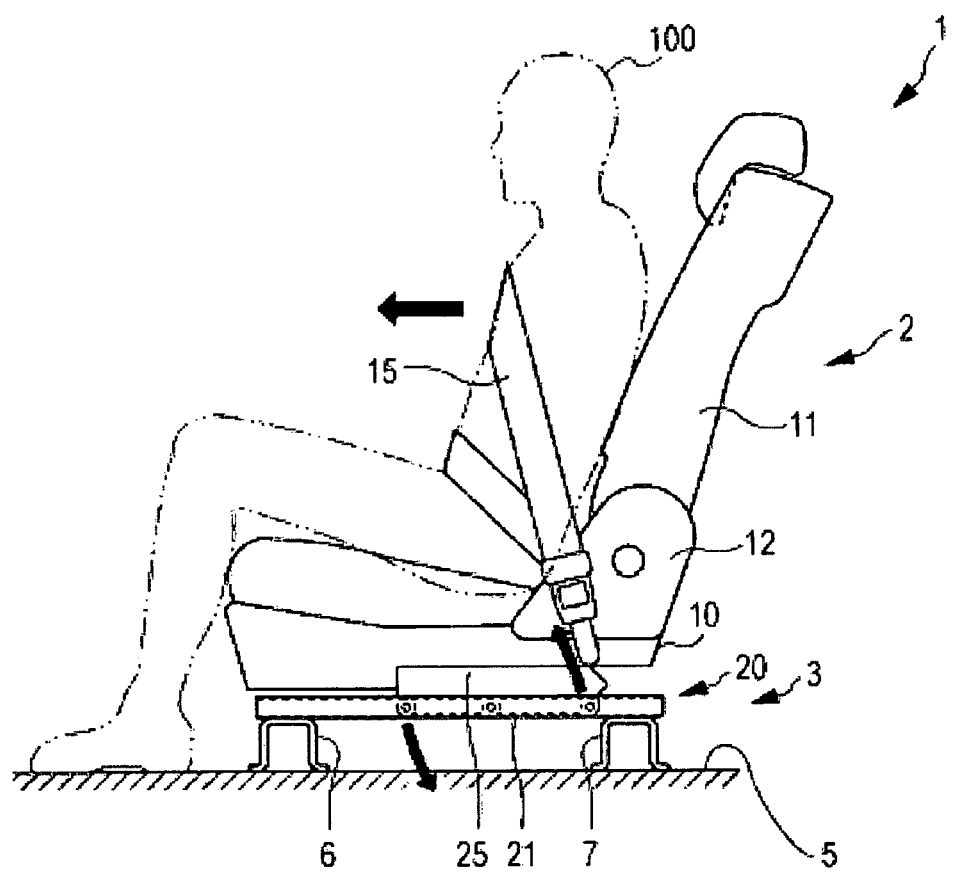
FIG. 1 is a schematic structural view of a vehicle seat.
Figure 2:
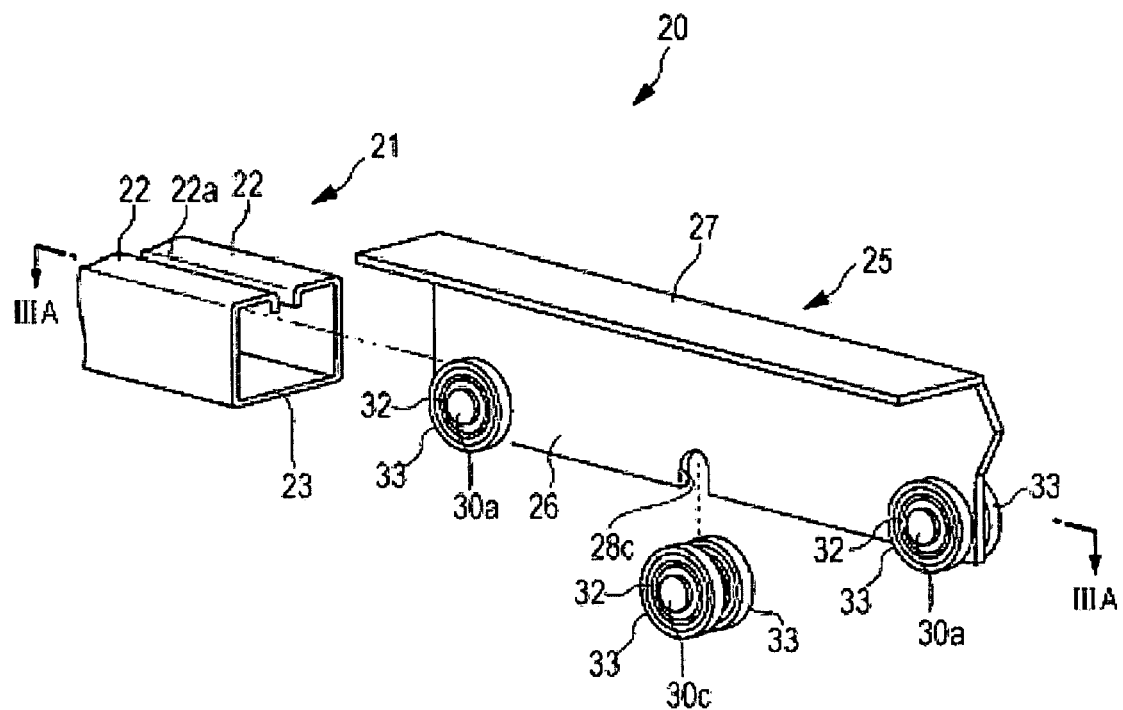
FIG. 2 is an exploded perspective view of main parts of a slide device.
Figure 4A:
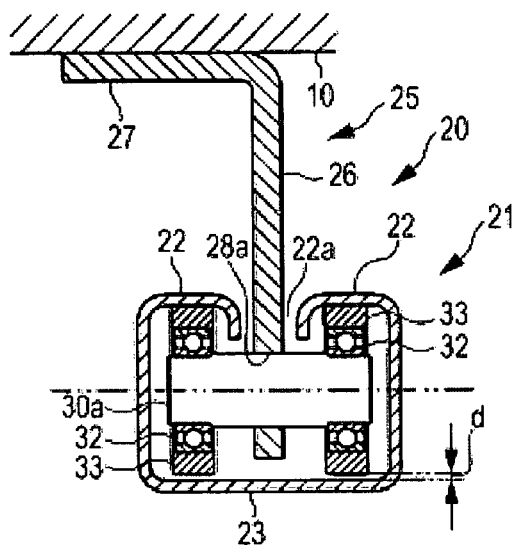
FIG. 4A is a sectional view of a main part taken along the line IVA-IVA of FIG. 3B.
Figure 4B:
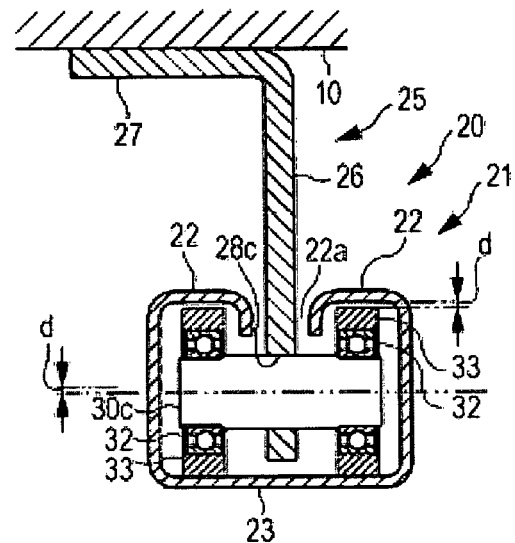
FIG. 4B is a sectional view of a main part taken along the line IVB-IVB of FIG. 3C.
Figure 5:
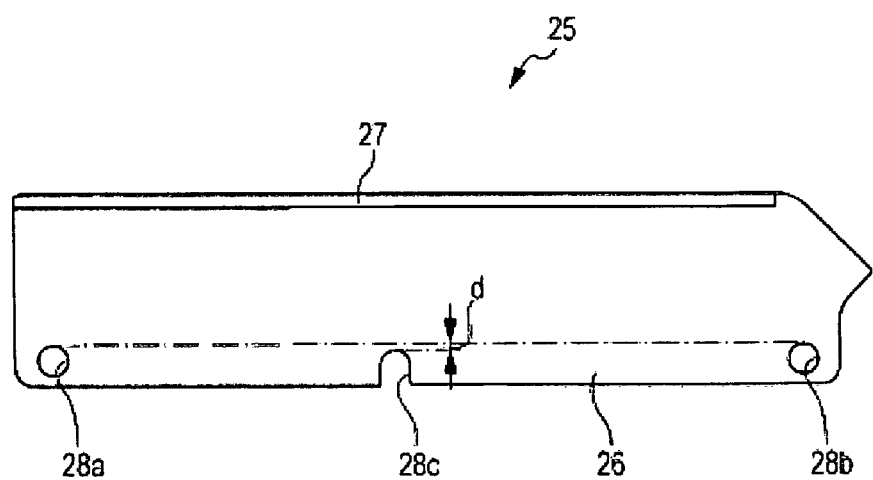
FIG. 5 is a side view of an upper rail.
Figure 6A:
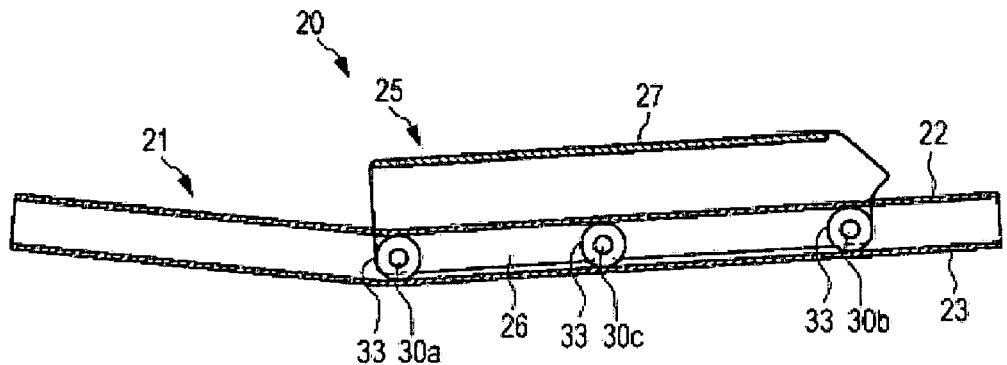
FIGS. 6A and 6B are explanatory views of an action of the upper rail when a lower rail is bent.
Figure 6B:
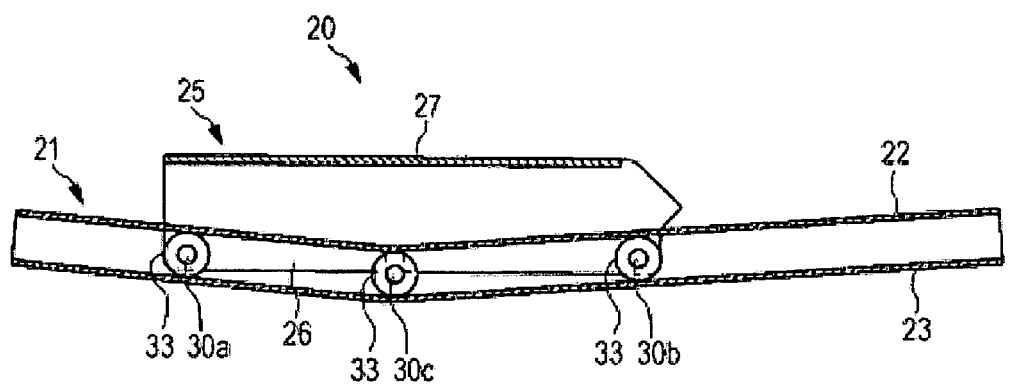
Figure 6C:
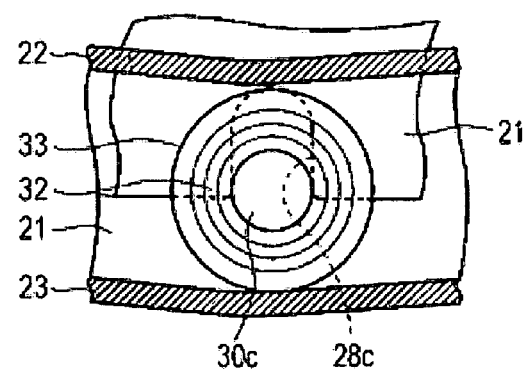
FIG. 6C is an enlarged sectional view showing a main part of FIG. 6B.

An embodiment of the present invention will hereunder be described with reference to the drawings. The drawings relate to one embodiment of the present invention. FIG. 1 is a schematic structural view of a vehicle seat. FIG. 2 is an exploded perspective view of a main part of a slide device. FIG. 3A is a sectional view of the slide device taken along the line IIIA-IIIA of FIG. 2. FIGS. 3B and 3C are enlarged sectional views of main parts. FIG. 4A is a sectional view of a main part taken along the line IVA-IVA of FIG. 3B. FIG. 4B is a sectional view of a main part taken along the line IVB-IVB of FIG. 3C. FIG. 5 is a side view of an upper rail. FIGS. 6A and 6B are explanatory views of an action of the upper rail when a lower rail is bent. FIG. 6C is an enlarged sectional view showing a main part of FIG. 6B.

A vehicle seat 1 shown in FIG. 1 is, for example, a seat that is disposed in the second row of a so-called three-row seating vehicle, which has three rows of seats in a vehicle compartment in the front-rear direction. The seat 1 is configured with a seat body 2, a slide device 3 supporting the seat body 2 on a floor 5 of a vehicle body.

The seat body 2 is configured with a seat cushion 10 on which an occupant 100 is seated, a seat back 11 tiltably connected to a rear portion of the seat cushion 10 via a reclining mechanism 12. A proximal end portion of a seat belt 15 is also connected to the rear portion of the seat cushion 10, the seat belt holding the occupant 100 to the seat body 2 upon a crash or the like.

The slide device 3 is mainly configured with a left and right pair of slide mechanisms 20 disposed in parallel in the vehicle width direction (FIG. 1 shows only one of the slide mechanisms 20).

Each of the slide mechanisms 20 is configured with a lower rail 21 extending in the font-rear direction of the vehicle body and an upper rail 25 being coupled to the lower rail so as to be relatively movable via a plurality of rollers 33 supported in the lower rail 21 so as to be rollable.

As shown in FIGS. 2 to 4B, the lower rail 21 is composed of an elongated sheet metal member having a substantially square tube shape. Between top walls 22 of the lower rail 21 is formed a slit 22a linearly extending in a longitudinal direction, via which the inside and the outside of the lower rail 21 are communicated with each other.

As shown in FIG. 1, a front and rear pair of cross members 6 and 7 are fixedly installed on the floor 5 of the vehicle body, and front and rear end portions of each of the lower rails 22 are fixedly installed to the cross members 6 and 7. By the front and rear end portions being fixedly installed to the cross members 6 and 7 as described above, the lower rails 21 are supported to the vehicle body 5 with a predetermined height over the floor 5.

As shown in FIGS. 2 to 5, the upper rail 25 is composed of, for example, a sheet metal member having a substantially reverse L-shaped cross-section. In the sheet metal member a vertical wall 26 installed in a standing manner inside and outside the lower rail, penetrating through the slit 22a, and a top wall 27 being bent from the top of the vertical wall 26 and extending in the vehicle width direction are integrally formed.

In the vertical wall 26 of the upper rail 25, a front end portion and a rear end portion of a bottom region to be engaged inside the lower rail 21 respectively have hole sections 28a and 28b penetrating in the vehicle width direction (see FIGS. 4A, 4B and 5). Roller shafts 30a and 30b are supported by insertion respectively at the hole sections 28a and 28b, and a left and right pair of rollers 33 are pivotally supported at both end portions of the roller shafts 30a and 30b individually by a bearing 32 (see FIGS. 2 to 4B). The roller shafts 30a and 30b are supported by insertion respectively to the hole sections 28a and 28b, and thereby the roller shafts 30a and 30b serve as the fixed shaft which is prohibited from moving on the upper rail 25 (vertical wall 26).

In the bottom region of the vertical wall 26, a cutout section 28c having a substantially reverse U-shape opening downward is formed between the hole sections 28a and 28b provided at the front and rear portions (see FIGS. 4A, 4B and 5). A roller shaft 30c is engaged to the cutout section 28c. A left and right pair of rollers 33 are pivotally supported at both end portions of the roller shaft 30c individually by the bearing 32 (see FIGS. 2 to 4B). The roller shaft 30c is supported by engagement to the cutout section 28, and thereby the roller shaft 30c serves as the movable shaft which is allowed to move downward on the upper rail 25 (vertical wall 26).

As shown in FIGS. 3A to 4B, the left and right pair of the rollers 33 pivotally supported by the roller shafts 30a to 30c are housed in the lower rail 21 and held between the top walls 22 disposed on the left and right sides of the slit 22a and a bottom wall 23 facing substantially parallel to the top walls 22. The upper rail 25 is coupled to the lower rail 21 so as to be relatively movable via the rollers 33 held in the lower rail 21, and thereby the seat body 2 fixedly installed to the top wall 27 of the upper rail 25 can be slided in the front-rear direction of the vehicle body.

In this embodiment, in order to achieve appropriate rolling of the rollers 33 in the lower rail 21, for example, outer diameters of the rollers 33 are set to be smaller than a gap between the top walls 22 and the bottom wall 23 of the lower rail 21 as shown in FIGS. 3 and 4, and thereby a set space d is formed between each of the rollers 33 and the lower rail 21.

Furthermore, for example as shown in FIG. 5, the top of the cutout section 28c on the vertical wall 26 is offset by the space d downward compared to the tops of the hole sections 28a and 28b arranged in the front and back of the cutout section 28c respectively. By this offset, the rollers 33 pivotally supported respectively by the roller shafts 33a and 33b are abutted to the top walls 22 of the lower rail 21, and the rollers 33 pivotally supported by the roller shaft 33c are abutted to the bottom wall 23 of the lower rail 21.

Appropriate rolling of the rollers 33 in the lower rail 21 is achieved by the formation of the space d between each of the rollers 33 and the lower rail 21, as described above.

In the case that rollers 33 are arranged in tandem at the three positions on the upper rail 25 such that the space d is formed between each of the rollers 33 and the lower rail 21, rattling of the upper rail 25 is also suppressed appropriately.

In particular, among the rollers arranged at the three positions in tandem, the position of the rollers 33 located at the intermediate position of the upper rail 25 is offset downward by the space d compared to the rollers 33 located at the front and rear portions, and thus it is possible to reliably prevent the upper rail 25 to rattle. Specifically, the rollers 33 located at the intermediate position are abutted to the bottom wall of the lower rail 21 by offsetting the positions among the rollers 33. Accordingly, at a normal state in which there is no deformation or the like in the lower rail 21, the roller shaft 30c engaged to the cutout section 28c is prohibited from moving downward, and the roller shaft 30c can substantially function as the fixed shaft. Furthermore, since the rollers 33 located at the intermediate position are abutted to the bottom wall 23 of the lower rail 21 as described above, the rollers 33 at the intermediate position and the rollers 33 which abutted to the top walls 22 of the lower rail 21 at the front and rear portions can cooperatively support the upper rail 25 appropriately with respect to the lower rail 21 at the three points in tandem.

Incidentally, when, for example, impact load applied to the occupant 100 is transmitted to the seat belt 15 or the like as shown with an arrow in FIG. 1 upon a vehicle crash or the like, load to move the front end portion side downward and to move the rear end portion side upward is applied to the upper rail 25. Accordingly, when the lower rail 21 is bent by the frontal crash, the lower rail 21 is most often bent so as to be convex downward (see FIG. 6A to 6C). Even in such a case, a smooth seat slide operation in the front-rear direction of the seat body 2 is maintained in the slide mechanism 20 of the present invention. Specifically, as shown in FIGS. 6A and 6B, when the upper rail 25 enters a bent portion 25 of the lower rail 21, the roller shaft 30c located at the intermediate position moves downward along the cutout section 28c (see FIG. 6C) to absorb a difference in height generated by the bend of the lower rail 21. Accordingly, upon the bend of the lower rail 21, the upper rail can be substantially moved in the front-rear direction in a same manner as a case in which the rollers 33 are arranged at two front and rear positions, and a smooth seat slide operation in the front-rear direction of the seat body 2 is maintained.

According to the above embodiment, the rollers 33 are arranged at three positions including the front and rear portions of the upper rail 25, and thus the upper rail 25 can be prevented from rattling, also when the space d is formed between each of the rollers 33 and the lower rail 21. Accordingly, among the rollers 33, those arranged on the front and rear portions of the upper rail 25 are pivotally supported by the roller shafts 30a and 30b which are prohibited from moving on the upper rail 25 while the rollers 33 located at the position other than the front and rear portions of the upper rail 25 are pivotally supported by the roller shaft 30c which is allowed to move downward on the upper rail 25. Therefore, even when the lower rail 21 is bent, the upper rail 25 can be appropriately moved in the front-rear direction while the difference in height due to the bend is absorbed by the vertical movement of the rollers 33 located at the position other than the front and rear portions. Therefore, the rigidity of the lower rail 21 does not have to be overly enhanced and thus the lower rail 21 can be produced with light weight and low cost.

In the above embodiment, the rollers arranged at three positions in tandem on the upper rail. However, the present invention is not limited to this embodiment, and four or more rollers can be arranged in tandem on an upper rail. Also in this case, among the rollers, those arranged at front and rear portions of the upper rail are pivotally supported by roller shafts which are prohibited from moving on the upper rail while rollers located at the positions other than the front and rear portions of the upper rail 25 are pivotally supported by roller shafts which are allowed to move downward on the upper rail. As a result, the same effects as those obtained in the above embodiment are obtained.

In addition, in the above embodiment, the downward movement of the roller shaft is achieved by engaging the roller shaft to the cutout section. However, the present invention is not limited to this embodiment, and, for example, the roller shaft may be allowed to move with a link mechanism or the like.

What is claimed is:

1. A slide device for a vehicle seat, the slide device comprising:
   a lower rail extending in a front-rear direction of a vehicle body and having a bottom wall and a top wall;
   an upper rail extending in the front-rear direction of the vehicle body and slidably supported on the lower rail; and
   a plurality of rollers provided between the bottom wall and the top wall of the lower rail so as to be rollable and arranged in tandem at three or more positions of the upper rail,
   the rollers at two positions among the rollers being pivotally supported by fixed shafts that are prohibited from moving on the upper rail, and
   the other rollers being pivotally supported by shafts that are fixed to the upper rail so as to move in a vertical direction.

2. The slide device for a vehicle seat according to claim 1, wherein the rollers located at front and rear portions of the upper rail are pivotally supported by fixed shafts that are prohibited from moving on the upper rail, and
   the rollers located at positions other than the front and rear portions of the upper rail are pivotally supported by shafts that are fixed to the upper rail so as to move downward.

3. The slide device for a vehicle seat according to claim 2, wherein the fixed shafts on the upper rail are set such that the rollers located at the front and rear portions of the upper rail are abutted to the top wall of the lower rail, and the movable shafts are set on the upper rail such that the rollers located at the positions other than the front and rear portions of the upper rail are abutted to the bottom wall.

4. The slide device for a vehicle seat according to claim 1, wherein the fixed shafts on the upper rail are set such that the rollers located at front and rear portions of the upper rail are abutted to the top wall of the lower rail, and the movable shafts are set on the upper rail such that the rollers located at positions other than the front and rear portions of the upper rail are abutted to the bottom wall.

5. The slide device for a vehicle seat according to claim 1, wherein the lower rail comprises a slit which linearly extends in the front-rear direction of the vehicle body.

6. The slide device for a vehicle seat according to claim 1, wherein the upper rail comprises a sheet metal member having a substantially reverse L-shaped cross-section.

7. The slide device for a vehicle seat according to claim 1, wherein the lower rail comprises a slit which linearly extends in the front-rear direction of the vehicle body,
   wherein the upper rail comprises a sheet metal member having a substantially reverse L-shaped cross-section, and
   wherein a vertical wall of the sheet metal member penetrates through the slit such that the slit slidably supports the upper rail.

8. The slide device for a vehicle seat according to claim 1, wherein the upper rail comprises cut-out sections having a substantially reverse U-shaped cross-section so as to pivotally support shafts of the other rollers to move downward.

9. The slide device for a vehicle seat according to claim 8, wherein the cut-out sections are arranged between the rollers at the two positions among the rollers are pivotally supported by the fixed shafts that are prohibited from moving on the upper rail.

10. A slide device for a vehicle seat, the slide device comprising:
    a lower rail extending in a front-rear direction of a vehicle body and having a bottom wall and a top wall;
    an upper rail extending in the front-rear direction of the vehicle body and slidably supported on the lower rail; and
    a plurality of rollers provided between the bottom wall and the top wall of the lower rail so as to be rollable and arranged in tandem at three or more positions of the upper rail,
    wherein the rollers at two positions among the rollers are pivotally supported by fixed shafts that are prohibited from moving on the upper rail,
    wherein the other rollers are pivotally supported by movable shafts that are allowed to move in a vertical direction on the upper rail, and
    wherein the movable shafts are supported by a cutout section of the upper rail, the cutout section opening downward.

11. A slide device for a seat, the slide device comprising:
    a lower rail extending in a front-rear direction of a vehicle body and having a bottom wall and a top wall;
    an upper rail extending in the front-rear direction of the vehicle body and slidably supported on the lower rail; and
    a plurality of rollers provided between the bottom wall and the top wall of the lower rail so as to be rollable and arranged in tandem at three or more positions of the upper rail,
    wherein the rollers located at front and rear portions of the upper rail are pivotally supported by fixed shafts that are prohibited from moving on the upper rail, wherein the rollers located at positions other than the front and rear portions of the upper rail are pivotally supported by movable shafts that are allowed to move downward on the upper rail, and wherein the movable shafts are supported by a cutout section of the upper rail, the cutout section opening downward.

12. A slide device for a vehicle seat, the slide device comprising:

a lower rail extending in a front-rear direction of a vehicle body and having a bottom wall and a top wall;

an upper rail extending in the front-rear direction of the vehicle body and slidably supported on the lower rail; and a plurality of rollers provided between the bottom wall and the top wall of the lower rail so as to be rollable and arranged in tandem at three or more positions of the upper rail, wherein the rollers at two positions among the rollers are pivotally supported by fixed shafts that are prohibited from moving on the upper rail, wherein the other rollers are pivotally supported by movable shafts that are allowed to move in a vertical direction on the upper rail, wherein the fixed shafts on the upper rail are set such that the rollers located at front and rear portions of the upper rail are abutted to the top wall of the lower rail, and the movable shafts are set on the upper rail such that the rollers located at positions other than the front and rear portions of the upper rail are abutted to the bottom wall of the lower rail, and wherein the movable shafts are supported by a cutout section of the upper rail, the cutout section opening downward.

13. A slide device for a vehicle seat, the slide device comprising:

a lower rail extending in a front-rear direction of a vehicle body and having a bottom wall and a top wall;

an upper rail extending in the front-rear direction of the vehicle body and slidably supported on the lower rail; and a plurality of rollers provided between a bottom wall and a top wall of the upper rail so as to be rollable and arranged in tandem at three or more positions of the upper rail, wherein the rollers located at front and rear portions of the upper rail are pivotally supported by fixed shafts that are prohibited from moving on the upper rail, wherein the rollers located at positions other than the front and rear portions of the upper rail are pivotally supported by movable shafts that are allowed to move downward on the upper rail, wherein the fixed shafts on the upper rail are set such that the rollers located at the front and rear portions of the upper rail are abutted to the top wall of the lower rail, and the movable shafts are set on the upper rail such that the rollers located at the positions other than the front and rear portions of the upper rail are abutted to the bottom wall of the lower rail, and wherein the movable shafts are supported by a cutout section of the upper rail, the cutout section opening downward.

* * * * *